July 6, 1948.   T. H. DENNIS, JR   2,444,635
TRUCK WARNING DEVICE
Filed Dec. 21, 1945
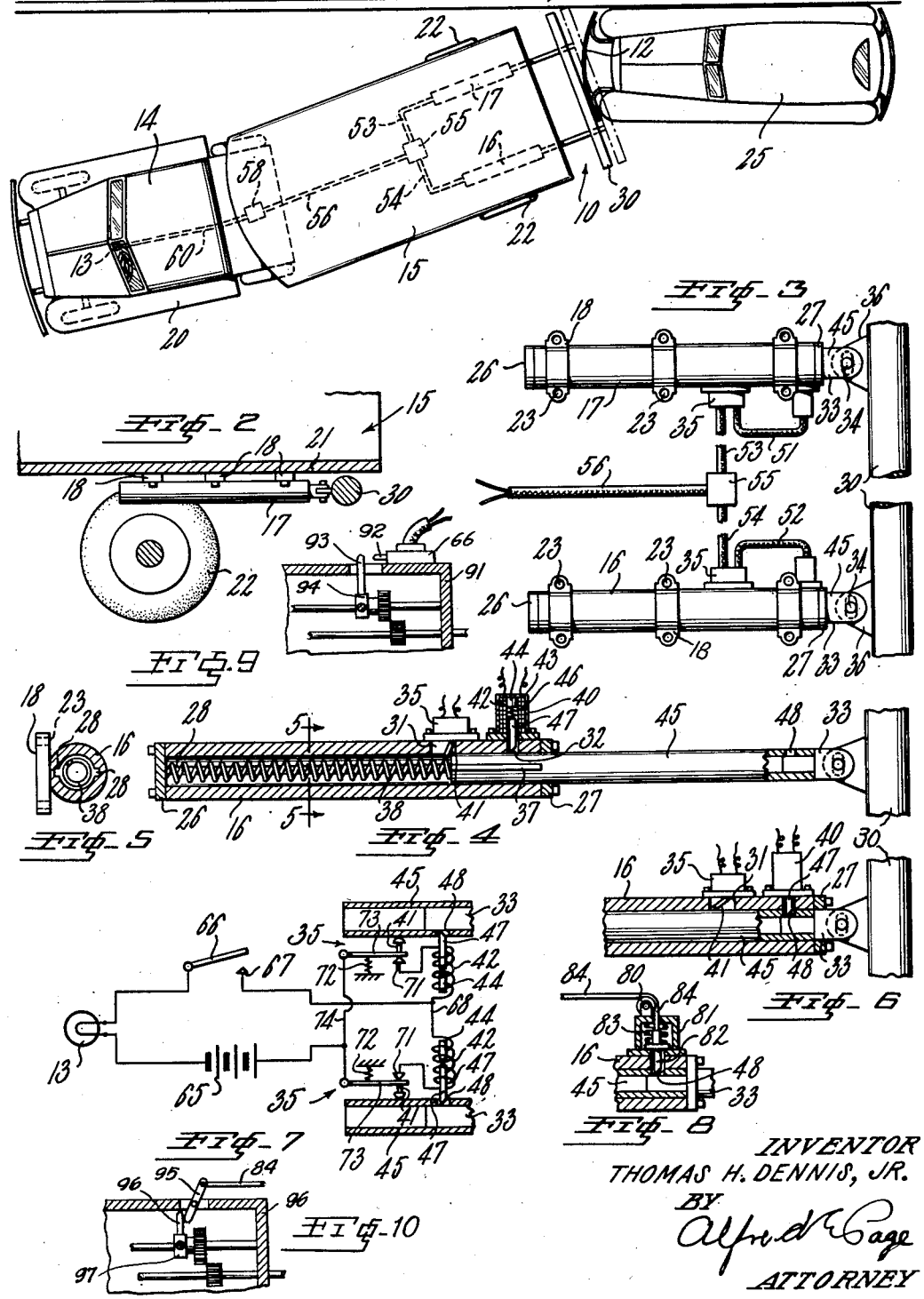
INVENTOR
THOMAS H. DENNIS, JR.
BY
Alfred Gage
ATTORNEY Patented July 6, 1948

2,444,635

UNITED STATES PATENT OFFICE 2,444,635

TRUCK WARNING DEVICE

Thomas H. Dennis, Jr., Tarrytown-on-Hudson, N. Y.

Application December 21, 1945, Serial No. 636,429

7 Claims. (Cl. 177—311)

This invention relates to warning devices for attachment to vehicles, and more particularly to a feeler operated signal arrangement for indicating the proximity of adjacent vehicles during a parking operation.

Various automatic controls and warning devices for vehicles have been proposed. Generally, such devices are actuated, upon contact of the vehicle with another vehicle, to apply the brakes, stop the engine or perform some other similar function. Such devices have been bulky, complicated and expensive and have not gone into general use because their operation was effected only when the proximity of the two vehicles was such that it was too late to prevent damage and collision.

It is among the objects of the present invention to provide a feeler actuated signal device for vehicles adapted to indicate the proximity of another vehicle in sufficient time to prevent collision between two vehicles; to provide a back-up warning device, particularly adapted for trucks, which is normally retracted during forward operation of a vehicle but adapted to be extended to act as a feeler during reverse movement of the vehicle, such as in parking, to indicate the proximity of an obstruction, such as a parked car, invisible to the operator of the vehicle; to provide a warning attachment for vehicles, such as trucks, which is normally latched in a retracted position within the outline of the vehicle body but is adapted to be automatically extended to an operative position upon initiation of reverse movement of the vehicle; to provide such a device which includes electrically operated means for signaling a vehicle driver, during a parking operation, when his vehicle approaches within a predetermined distance of an obstruction in the vehicle's path; and to provide a simple, inexpensive and effective feeler actuated signal device adapted for quick and easy attachment to motor vehicles.

These and other objects, advantages and novel features of the invention will be apparent from the following description and the accompanying drawing.

In the drawing:

Fig. 1 is a somewhat diagrammatic plan view illustrating the operation of the invention device.

Fig. 2 is an inside elevation view of an element of the device as installed on a truck.

Fig. 3 is a plan view of the invention device, detached from a vehicle.

Fig. 4 is a plan view, partly in section, of the device in the extended or operative position.

Fig. 5 is a transverse sectional view on the line 5—5 of Fig. 4.

Fig. 6 is a view similar to Fig. 4 illustrating the device in the retracted or inoperative position.

Fig. 7 is a schematic wiring diagram illustrating the operation of the invention.

Fig. 8 is a plan view, partly in section, illustrating a modified embodiment of the invention.

Fig. 9 is a somewhat schematic sectional view of a transmission, illustrating a gear shift actuated switch.

Fig. 10 is a view similar to Fig. 9 illustrating an equivalent mechanical arrangement.

Generally speaking, the present invention comprises a feeler bar or bumper in combination with automatically operable latching and signal means, all arranged as a unit for ready attachment to a vehicle such as a motor truck. The latching means are provided to normally maintain the feeler bar retracted within the outline of the vehicle body so as not to interfere with loading and unloading operations. Preferably, the operation of conditioning the vehicle for reverse movement, as in parking, effects automatic release of the latching means so that the feeler bar is extended to an operative position a predetermined distance beyond the rear end of the vehicle.

Relatively light resilient means maintain the bar in the extended position. Upon contact of the bar with a nearby vehicle, the resilient means are compressed permitting the bar to move inwardly. Such inward movement effects actuation of a signal means preferably located in the driver's compartment or cab, whereby the driver is warned if he is too close to a vehicle parked in back of his vehicle. Desirably, the latching means may be either electrically or mechanically released by operation of the gear selector mechanism of the vehicle when the gearing is conditioned for reverse movement.

Referring to Fig. 1 of the drawings, the device 10 of the invention is illustrated as mounted upon trailer 15 connected to a tractor 20. Tractor 20 is illustrated in the process of backing trailer 15 into a parking space adjacent curbing 11, along which another vehicle, such as a motor car 25, is parked.

As trailer 15 is backed towards motor car 25, a feeler bar 30 forming part of device 10 contacts a portion of car 25, such as bumper 12, and is moved from the position shown in dotted lines to the position shown in full lines. Such movement, in a manner described more fully hereinafter, actuates electric switch means included in device 10 to operate a signal 13 in the driver's cab 14 of tractor 20. This advises the driver that the rear end of his vehicle is then a predetermined distance from another vehicle or other obstruction located to the rear, so that the driver may take corrective action.

Referring more particularly to Figs. 2 through 6 and 9, device 10 includes a pair of cylinders 16, 17 provided with flanges 18 by means of which cylinders 16, 17 may be detachably affixed to the underside of floor 21 of trailer 15 or a similar vehicle. Cylinders 16, 17 extend longitudinally of floor 21 and are located preferably inside of wheels 22, 22 of the trailer or truck. Flanges 19 are provided with apertures 23 adapted to receive suitable fastening means, whereby the cylinders may be secured to the truck body.

As the cylinders are identical in construction, only cylinder 16 will be described in detail. The inner end of cylinder 16 is closed by a suitable plate 26 and the outer end has secured thereto an apertured plate 27. For a purpose to be described, cylinder 16 has a pair of diametrically opposite longitudinally extending keyways 28 (Fig. 5). Furthermore a snap-action switch 35 and a solenoid latch 40 are mounted on the inward side of each cylinder, adjacent apertures 31 and 32 respectively. The purpose of the switch and latch will be clear from the following description.

A lightweight tubular plunger 45 is slidably mounted in each cylinder and extends through plate 27. An eye 33 is secured in the outer end of each plunger for attachment by suitable means, such as a bolt 34, through a slot in an ear 36 on feeler bar 30. The attachment of the feeler bar to the plungers is a lost motion connection, thereby providing for any possible twisting movement of the feeler bar due to off-center impacts, without binding of plungers 45 in the cylinders.

The inner end of each plunger is provided with a pair of diametrically opposite ribs 37 which slidably engage keyways 28 and also act as abutments to limit the outward movement of the plungers by engagement with plate 27. A relatively light compression spring 38 is disposed between end plate 26 and the inner end of plunger 45, normally lightly biasing the plunger, and the attached feeler bar 30, to an extended position.

Figs. 1 and 4 show device 10 in the operative or extended position, whereas Figs. 2, 3 and 6 show device 10 in the normally retracted, inoperative position. As shown most clearly in Fig. 4, in the extended position, the inner end of plunger 45 has cleared the operating lever 41 of switch 35. The latter is a snap-action switch normally biased to the open position. Similarly, in the position shown in Fig. 4 latching mechanism 40 is held retracted by plunger 45.

The latching mechanism comprises a solenoid winding 42 disposed in a suitable case 43. A fixed core 44 of magnetic material is disposed adjacent the inward end of coil 42 and a compression spring 46 is disposed between fixed core 44 and movable core or plunger 47. Spring 46 normally biases plunger 47 through aperture 32 into cylinder 16. In the retracted position of mechanism 10, plunger 47 engages an aperture 48 in plunger 45 to lock plunger 45 in such retracted position. Likewise, in the position shown in Fig. 6 operating lever 41 of switch 35 is held by plunger 45 in a position closing switch 35.

The operation of the invention thus far described will be best understood by reference to Figs. 1, 3 and 7. A pair of conductors connected to coils 42 are joined in cables 51, 52 which are connected to switches 35. Cables 53, 54 connect switches 35 to junction box 55. The latter is connected by a cable 56 to a suitable detachable connection or plug 58 located adjacent the forward end of trailer 15. Another cable 59 connects the part of connection 58 secured to tractor 20 to warning signal 13 and the electrical supply, such as the generator or battery, of tractor 20.

The wiring diagram is shown schematically in Fig. 7. One terminal of the vehicle battery or power supply 65 is connected to warning light 13. The other terminal of warning light 13 is connected to one terminal of a switch 66 which is preferably connected with the gearing selector mechanism of tractor 20 so that, when the tractor is put in "reverse," switch 66 is closed. The contact 67 of switch 66 is connected to a conductor 68 which in turn connects a pair of terminals of coil 42 in parallel. The other terminals of coils 42 are each connected to a contact 71 of one of the switches 35. Springs 72, 72 normally bias the blades 73, 73 thereof out of engagement with contacts 71, opening the switches. However, in the position shown in Fig. 7, switches 35 are maintained closed by abutment of operating levers 41, 41 with plungers 45, 45. Blades 73, 73 are connected in parallel by a conductor 74 and to the other terminal of power supply 65.

Referring to Fig. 9, switch 66 is mounted on a transmission housing 91 and has an operating button 92. The latter is in the path of movement of an arm 93 on a gear selector fork 94. As fork 94 is moved to place the transmission in "reverse," arm 93 depresses button 92 to close switch 66.

When switch 66 is closed, solenoid coils 42 are energized to retract latching locking plungers 47 from apertures 48. This releases plungers 45 to be biased to the outward or operative position by light springs 38. As plungers 45 reach the limit of their outward movement, as provided by abutment of ribs 37 against end plate 27, plungers 41 are released, opening switches 35 and breaking the circuit through solenoid coils 42.

As the vehicle continues to back up, feeler bar 30 projects rearwardly therebeyond to engage any obstruction, such as another vehicle 25, located in the path of such rearward movement. If an obstruction is encountered, one or both of the plungers 45 move inwardly instantly against the relatively light force exerted by springs 38, to swing switch operating levers 41 and close switches 35. This completes a circuit through warning signal 13, apprising the vehicle driver of the proximity of an obstruction in time for him to arrest the rearward motion of his vehicle.

When a parking operation, or other rearward movement is completed, the vehicle operator manually pushes feeler rod 30 to its retracted position within the outlines of vehicle 15, where it is automatically locked by engagement of latches 47 in apertures 48. At such time, the gear selector mechanism will no longer be in reverse and therefore solenoids 42 will be deenergized to provide for springs 46 to snap latches 47 into locking engagement with plungers 45. The device is thus retained in its inoperative position, where it does not interfere with loading or unloading of the vehicle.

Fig. 8 illustrates an alternative latching arrangement for plungers 45. In the embodiment shown in Fig. 8, a casing 81 is mounted on cylinder 16 and encloses a latching plunger 82 normally urged to a locking position by a compression spring 83. A cable 84 extends over a suitable guide, such as a pulley 90, and is attached at its other end to the gear selector mechanism in such a manner that, when the vehicle is placed in "reverse," the cable 84 is drawn taut pulling latch 82 into casing 81 against the force of spring 83. Referring to Fig. 10, cable 84 is attached to the outer end of a link 95 pivoted in a transmission housing 96. The inner end of link 95 is in the path of movement of an arm 86 on a gear selector fork 97. As fork 97 is moved to the "reverse" position, arm 86 strikes link 95 to swing it counter-clockwise, pulling cable 84.

The described arrangements comprise simple and effective automatic warning devices which may be detachably mounted on any vehicle to provide a warning of the proximity of another vehicle in a projected path of movement. In its retracted position, the device imposes no drain upon the power supply of the vehicle and is latched in an out-of-the-way position not interfering with full use of the vehicle facilities. When the vehicle is conditioned for movement along the projected path, the device is automatically released for projection to an operative condition to warn the driver when the end of his vehicle is dangerously close to an obstruction in the path of movement. The device is inexpensive, easily manufactured, and easily adapted to any type of vehicle in which the driver's view is obstructed in one direction of movement. Such obstruction is common in relatively large trucking units, particularly of the tractor-trailer type. As distinguished from prior art devices, the present arrangement provides a warning for the driver a considerable period before there is actual contact between his vehicle and the obstruction. Desirably, feeler bar 30 is covered with a cushioning material, such as rubber, to prevent damage to contacted obstructions.

While specific embodiments of the invention have been shown and described in detail to illustrate the application of the principles thereof, it will be understood that the invention may be otherwise embodied without departing from such principles.

I claim:

1. A vehicle warning device comprising, in combination, feeler means arranged to project beyond an end of the vehicle to contact an obstruction in the path of the vehicle; means for mounting said feeler means adjacent one end of the vehicle; biasing means urging said feeler means to an extended position beyond such end of the vehicle; an electrically energized signal mounted on the vehicle; a switch in circuit with said signal and a source of power and operable by said feeler means upon inward movement from such extended position due to contact with an obstruction in the path of the vehicle to energize said signal; latching means normally effective to retain said feeler means in a retracted position inwardly of such end of the vehicle; and means operable, when the vehicle is conditioned to move in a direction to advance such one end, to release said latching means so that said biasing means urges said feeler means to a position in advance of such end.

2. A vehicle warning device, arranged for mounting on a motor vehicle having gear selector mechanism, comprising, in combination, feeler means arranged to project beyond an end of the vehicle to contact an obstruction in the path of the vehicle; means for mounting said feeler means adjacent one end of the vehicle; biasing means urging said feeler means to an extended position beyond such end of the vehicle; a signal mounted on the vehicle; activating means for said signal operable by said feeler means upon inward movement from such extended position due to contact with an obstruction in the path of the vehicle; latching means normally effective to retain said feeler means in a retracted position inwardly of such end of the vehicle; and means mechanically connecting said latching means to the gear selector mechanism and effective, upon movement of the latter to a selected position, to release said latching means so that said biasing means urges said feeler means to a position in advance of such end.

3. A vehicle warning device, arranged for mounting on a motor vehicle having gear selector mechanism, comprising, in combination, feeler means arranged to project beyond an end of the vehicle to contact an obstruction in the path of the vehicle; means for mounting said feeler means adjacent one end of the vehicle; biasing means urging said feeler means to an extended position beyond such end of the vehicle; a signal mounted on the vehicle; activating means for said signal operable by said feeler means upon inward movement from such extended position due to contact with an obstruction in the path of the vehicle; latching means normally effective to retain said feeler means in a retracted position inwardly of such end of the vehicle; electrically operable means effective to release said latching means; and means, including circuit connection, connecting said electrically operable means to the gear selector mechanism and effective, upon movement of the latter to a selected position to energize said electrically operable means to release said latching means so that said biasing means urges said feeler means to a position in advance of such end.

4. A vehicle warning device, arranged for mounting on a motor vehicle having gear selector mechanism, comprising, in combination, a pair of telescoping members arranged for mounting longitudinally of the vehicle adjacent the rear end and within the outline thereof; feeler means secured to the outer end of one of said members; relatively light spring means effective to bias said members to an extended position with said feeler means projecting substantially beyond the rear end of the vehicle to contact an obstruction in the path of the vehicle; latching means mounted on said one member and normally effective to maintain said members in the retracted position; means operable, upon movement of the gear selector mechanism to the "reverse" position, to release said latching means; an electrically energized signal mounted on the vehicle; a normally open switch mounted on the other member and having an operating element disposed in the path of inward movement of said one member; and circuit means connecting said switch in series circuit relation with said signal and a source of power; said one member, upon inward movement of said feeler means due to contact with an obstruction, engaging said element to close said switch to energize said signal.

5. A vehicle warning device, arranged for mounting on a motor vehicle having gear selector mechanism, comprising, in combination, a pair of telescoping members arranged for mounting longitudinally of the vehicle adjacent the rear end and within the outline thereof; feeler means secured to the outer end of one of said members; relatively light spring means effective to bias said members to an extended position with said feeler means projecting substantially beyond the rear end of the vehicle to contact an obstruction in the path of the vehicle; an electrically energized signal mounted on the vehicle; a normally open switch mounted on the other member and having an operating element disposed in the path of inward movement of said one member; circuit means connecting said switch in series circuit relation with said signal and a source of power; said one member, upon inward movement of said feeler means due to contact with an obstruction, engaging said element to close said switch to energize said signal; latching means mounted on said one member and normally effective to maintain said members in the retracted position; solenoid means operable, where energized to release said latching means; and switch means in series circuit relation with said solenoid means and said source of power and operable, upon movement of the gear selector mechanism to the "reverse" position, to energize said solenoid means.

6. A vehicle warning device, arranged for mounting on a motor vehicle having gear selector mechanism comprising, in combination, a pair of telescoping members arranged for mounting longitudinally of the vehicle adjacent the rear end and within the outline thereof; feeler means secured to the outer end of one of said members; relatively light spring means effective to bias said members to an extended position with said feeler means projecting substantially beyond the rear end of the vehicle to contact an obstruction in the path of the vehicle; latching means mounted on said one member and normally effective to maintain said members in the retracted position; mechanical means connecting said latching means to the gear selector mechanism and operable, upon movement of the gear selector mechanism to the "reverse" position, to release said latching means; an electrically energized signal mounted on the vehicle; a normally open switch mounted on the other member and having an operating element disposed in the path of inward movement of said one member; and circuit means connecting said switch in series circuit relation with said signal and a source of power; said one member, upon inward movement of said feeler means due to contact with an obstruction, engaging said element to close said switch to energize said signal.

7. A vehicle warning device, arranged for mounting on a motor vehicle having gear selector mechanism, comprising, in combination, a pair of cylinders arranged for mounting longitudinally of the vehicle adjacent the rear end and within the outline thereof; a pair of rods each slidably mounted in one of said cylinders; a feeler bar connecting the outer ends of said rods; relatively light spring means effective to bias said rods to an extended position with said feeler bar projecting substantially beyond the rear end of the vehicle to contact an obstruction in the path of the vehicle; a pair of normally open switches each mounted on one of said cylinders and having operating elements projecting into said cylinders for immediate engagement by said rods upon any inward movement of said bar from the extended position; a pair of solenoids each mounted on one of said cylinders and having spring biased cores projectable into said cylinders and into locking recesses in said rods in the retracted position of said bar; an electrically energized signal mounted on the vehicle; normally open switch means operable to a closed position by movement of the gear selector mechanism to the "reverse" position; first circuit means connecting said switches in parallel circuit relation; second circuit means connecting said solenoids in parallel circuit relation; and third circuit means connecting said switches, said solenoids, said switch means and said signal in series circuit relation with a source of power, whereby, when the gear selector mechanism is moved to the "reverse" position, said solenoids will be energized to release said rods to project said bar and, when said bar engages an obstruction, said switches will be closed to energize said signal.

THOMAS H. DENNIS, Jr.

REFERENCES CITED

The following references are of record in the file of this patent:

UNITED STATES PATENTS

| Number | Name | Date |
|---|---|---|
| 956,952 | Emden et al. | May 3, 1910 |
| 2,259,614 | Chang | Oct. 21, 1941 |